United States Patent
Shapira et al.

(10) Patent No.: US 8,644,844 B2
(45) Date of Patent: Feb. 4, 2014

(54) EXTENDING OUTDOOR LOCATION BASED SERVICES AND APPLICATIONS INTO ENCLOSED AREAS

(75) Inventors: Isaac Shapira, Petach Tikva (IL); Yair Shapira, Shoham (IL); Catherine Zatloukal, North Potomac, MD (US)

(73) Assignee: Corning MobileAccess Ltd., Airport City (IL)

( * ) Notice: Subject to any disclaimer, the term of this patent is extended or adjusted under 35 U.S.C. 154(b) by 278 days.

(21) Appl. No.: 12/809,603

(22) PCT Filed: Dec. 21, 2008

(86) PCT No.: PCT/IB2008/055478
§ 371 (c)(1),
(2), (4) Date: Jul. 26, 2010

(87) PCT Pub. No.: WO2009/081376
PCT Pub. Date: Jul. 2, 2009

(65) Prior Publication Data
US 2010/0291949 A1    Nov. 18, 2010

Related U.S. Application Data

(60) Provisional application No. 61/008,313, filed on Dec. 20, 2007.

(51) Int. Cl.
*H04W 24/00*    (2009.01)
(52) U.S. Cl.
USPC .................. 455/456.1; 455/422.1; 455/444
(58) Field of Classification Search
USPC ........................................... 455/456.1–456.6
See application file for complete search history.

(56) References Cited

U.S. PATENT DOCUMENTS

| | | |
|---|---|---|
| 4,365,865 A | 12/1982 | Stiles |
| 4,449,246 A | 5/1984 | Seiler et al. |
| 4,573,212 A | 2/1986 | Lipsky |
| 4,665,560 A | 5/1987 | Lange |
| 4,867,527 A | 9/1989 | Dotti et al. |
| 4,889,977 A | 12/1989 | Haydon |
| 4,896,939 A | 1/1990 | O'Brien |
| 4,916,460 A | 4/1990 | Powell |

(Continued)

FOREIGN PATENT DOCUMENTS

| | | |
|---|---|---|
| AU | 645192 B | 10/1992 |
| AU | 731180 AU | 3/1998 |

(Continued)

OTHER PUBLICATIONS

A.J. Cooper, "Fiber/Radio for the Provision of Cordless/Mobile Telephony Services in the Access Network," Electronics Letters, vol. 26, pp. 2054-2056, 1990.

(Continued)

*Primary Examiner* — Vladimir Magloire
(74) *Attorney, Agent, or Firm* — C. Keith Montgomery

(57) ABSTRACT

Methods and systems for indoor mobile unit positioning, for seamlessly toggling a mobile unit positioning between outdoor positioning and indoor positioning and for providing location based services or application generated by an external location server to the mobile unit while the mobile unit is indoors. The indoor mobile unit positioning includes mobile unit-based positioning which makes use of reception of access point signals by the mobile unit.

9 Claims, 9 Drawing Sheets

(56) References Cited

U.S. PATENT DOCUMENTS

| | | |
|---|---|---|
| 4,939,852 A | 7/1990 | Brenner |
| 4,972,346 A | 11/1990 | Kawano et al. |
| 5,039,195 A | 8/1991 | Jenkins et al. |
| 5,042,086 A | 8/1991 | Cole et al. |
| 5,056,109 A | 10/1991 | Gilhousen et al. |
| 5,059,927 A | 10/1991 | Cohen |
| 5,125,060 A | 6/1992 | Edmundson |
| 5,187,803 A | 2/1993 | Sohner et al. |
| 5,189,718 A | 2/1993 | Barrett et al. |
| 5,189,719 A | 2/1993 | Coleman et al. |
| 5,206,655 A | 4/1993 | Caille et al. |
| 5,208,812 A | 5/1993 | Dudek et al. |
| 5,210,812 A | 5/1993 | Nilsson et al. |
| 5,260,957 A | 11/1993 | Hakimi et al. |
| 5,263,108 A | 11/1993 | Kurokawa et al. |
| 5,267,122 A | 11/1993 | Glover et al. |
| 5,268,971 A | 12/1993 | Nilsson et al. |
| 5,278,989 A | 1/1994 | Burke et al. |
| 5,280,472 A | 1/1994 | Gilhousen et al. |
| 5,299,947 A | 4/1994 | Barnard |
| 5,301,056 A | 4/1994 | O'Neill |
| 5,325,223 A | 6/1994 | Bears |
| 5,339,058 A | 8/1994 | Lique |
| 5,339,184 A | 8/1994 | Tang |
| 5,343,320 A | 8/1994 | Anderson |
| 5,377,035 A | 12/1994 | Wang et al. |
| 5,379,455 A | 1/1995 | Koschek |
| 5,381,459 A | 1/1995 | Lappington |
| 5,396,224 A | 3/1995 | Dukes et al. |
| 5,400,391 A | 3/1995 | Emura et al. |
| 5,420,863 A | 5/1995 | Taketsugu et al. |
| 5,424,864 A | 6/1995 | Emura |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,519,830 A | 5/1996 | Opoczynski |
| 5,543,000 A | 8/1996 | Lique |
| 5,546,443 A | 8/1996 | Raith |
| 5,557,698 A | 9/1996 | Gareis et al. |
| 5,574,815 A | 11/1996 | Kneeland |
| 5,598,288 A | 1/1997 | Collar |
| 5,602,903 A | 2/1997 | LeBlanc et al. ............... 379/60 |
| 5,606,725 A | 2/1997 | Hart |
| 5,615,034 A | 3/1997 | Hori |
| 5,627,879 A | 5/1997 | Russell et al. |
| 5,640,678 A | 6/1997 | Ishikawa et al. |
| 5,644,622 A | 7/1997 | Russell et al. |
| 5,648,961 A | 7/1997 | Ebihara |
| 5,651,081 A | 7/1997 | Blew et al. |
| 5,668,562 A | 9/1997 | Cutrer et al. |
| 5,677,974 A | 10/1997 | Elms et al. |
| 5,682,256 A | 10/1997 | Motley et al. |
| 5,703,602 A | 12/1997 | Casebolt |
| 5,708,681 A | 1/1998 | Malkemes et al. |
| 5,726,984 A | 3/1998 | Kubler et al. |
| 5,765,099 A | 6/1998 | Georges et al. |
| 5,790,536 A | 8/1998 | Mahany et al. |
| 5,790,606 A | 8/1998 | Dent |
| 5,802,173 A | 9/1998 | Hamilton-Piercy et al. |
| 5,802,473 A | 9/1998 | Rutledge et al. |
| 5,805,983 A | 9/1998 | Naidu et al. |
| 5,809,395 A | 9/1998 | Hamilton-Piercy et al. |
| 5,809,431 A | 9/1998 | Bustamante et al. |
| 5,812,296 A | 9/1998 | Tarusawa et al. |
| 5,818,619 A | 10/1998 | Medved et al. |
| 5,818,883 A | 10/1998 | Smith et al. |
| 5,821,510 A | 10/1998 | Cohen et al. |
| 5,825,651 A | 10/1998 | Gupta et al. |
| 5,838,474 A | 11/1998 | Stilling |
| 5,839,052 A | 11/1998 | Dean et al. |
| 5,854,986 A | 12/1998 | Dorren et al. |
| 5,859,719 A | 1/1999 | Dentai et al. |
| 5,862,460 A | 1/1999 | Rich |
| 5,867,485 A | 2/1999 | Chambers et al. |
| 5,867,763 A | 2/1999 | Dean et al. |
| 5,873,040 A | 2/1999 | Dunn et al. ............... 455/456 |
| 5,881,200 A | 3/1999 | Burt |
| 5,883,882 A | 3/1999 | Schwartz |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,953,670 A | 9/1999 | Newson |
| 5,959,531 A | 9/1999 | Gallagher, III et al. |
| 5,960,344 A | 9/1999 | Mahany |
| 5,969,837 A | 10/1999 | Farber et al. |
| 5,983,070 A | 11/1999 | Georges et al. |
| 5,987,303 A | 11/1999 | Dutta et al. |
| 6,005,884 A | 12/1999 | Cook et al. |
| 6,006,069 A | 12/1999 | Langston |
| 6,006,105 A | 12/1999 | Rostoker et al. |
| 6,011,980 A | 1/2000 | Nagano et al. |
| 6,014,546 A | 1/2000 | Georges et al. |
| 6,016,426 A | 1/2000 | Bodell |
| 6,023,625 A | 2/2000 | Myers, Jr. |
| 6,037,898 A | 3/2000 | Parish et al. |
| 6,069,721 A | 5/2000 | Oh et al. |
| 6,088,381 A | 7/2000 | Myers, Jr. |
| 6,118,767 A | 9/2000 | Shen et al. |
| 6,122,529 A | 9/2000 | Sabat, Jr. et al. |
| 6,127,917 A | 10/2000 | Tuttle |
| 6,128,470 A | 10/2000 | Naidu et al. |
| 6,128,477 A | 10/2000 | Freed |
| 6,148,041 A | 11/2000 | Dent |
| 6,150,921 A | 11/2000 | Werb et al. |
| 6,157,810 A | 12/2000 | Georges et al. |
| 6,192,216 B1 | 2/2001 | Sabat, Jr. et al. |
| 6,194,968 B1 | 2/2001 | Winslow |
| 6,212,397 B1 | 4/2001 | Langston et al. |
| 6,222,503 B1 | 4/2001 | Gietema et al. |
| 6,223,201 B1 | 4/2001 | Reznak |
| 6,232,870 B1 | 5/2001 | Garber et al. |
| 6,236,365 B1 | 5/2001 | LeBlanc et al. ............... 342/457 |
| 6,236,789 B1 | 5/2001 | Fitz |
| 6,236,863 B1 | 5/2001 | Waldroup et al. |
| 6,240,274 B1 | 5/2001 | Izadpanah |
| 6,249,252 B1 | 6/2001 | Dupray ............... 342/450 |
| 6,268,946 B1 | 7/2001 | Larkin et al. |
| 6,275,990 B1 | 8/2001 | Dapper et al. |
| 6,279,158 B1 | 8/2001 | Geile et al. |
| 6,286,163 B1 | 9/2001 | Trimble |
| 6,292,673 B1 | 9/2001 | Maeda et al. |
| 6,295,451 B1 | 9/2001 | Mimura |
| 6,307,869 B1 | 10/2001 | Pawelski |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,241 B1 | 12/2001 | Fort |
| 6,330,244 B1 | 12/2001 | Swartz et al. |
| 6,334,219 B1 | 12/2001 | Hill et al. |
| 6,336,021 B1 | 1/2002 | Nukada |
| 6,336,042 B1 | 1/2002 | Dawson et al. |
| 6,337,754 B1 | 1/2002 | Imajo |
| 6,340,932 B1 | 1/2002 | Rodgers et al. |
| 6,353,406 B1 | 3/2002 | Lanzl et al. |
| 6,353,600 B1 | 3/2002 | Schwartz et al. |
| 6,359,714 B1 | 3/2002 | Imajo |
| 6,370,203 B1 | 4/2002 | Boesch et al. |
| 6,374,078 B1 | 4/2002 | Williams et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,404,775 B1 | 6/2002 | Leslie et al. |
| 6,405,018 B1 | 6/2002 | Reudink et al. |
| 6,405,058 B2 | 6/2002 | Bobier |

(56) References Cited

U.S. PATENT DOCUMENTS

| | | |
|---|---|---|
| 6,405,308 B1 | 6/2002 | Gupta et al. |
| 6,414,624 B2 | 7/2002 | Endo et al. |
| 6,415,132 B1 | 7/2002 | Sabat, Jr. |
| 6,421,327 B1 | 7/2002 | Lundby et al. |
| 6,438,301 B1 | 8/2002 | Johnson et al. |
| 6,438,371 B1 | 8/2002 | Fujise et al. |
| 6,448,558 B1 | 9/2002 | Greene |
| 6,452,915 B1 | 9/2002 | Jorgensen |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,965 B1 | 12/2002 | Lucidarme |
| 6,504,636 B1 | 1/2003 | Seto et al. |
| 6,512,478 B1 | 1/2003 | Chien |
| 6,519,395 B1 | 2/2003 | Bevan et al. |
| 6,519,449 B1 | 2/2003 | Zhang et al. |
| 6,525,855 B1 | 2/2003 | Westbrook et al. |
| 6,535,330 B1 | 3/2003 | Lelic et al. |
| 6,535,720 B1 | 3/2003 | Kintis et al. |
| 6,556,551 B1 | 4/2003 | Schwartz |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,587,514 B1 | 7/2003 | Wright et al. |
| 6,594,496 B2 | 7/2003 | Schwartz |
| 6,597,325 B2 | 7/2003 | Judd et al. |
| 6,598,009 B2 | 7/2003 | Yang |
| 6,606,430 B2 | 8/2003 | Bartur et al. |
| 6,615,074 B2 | 9/2003 | Mickle et al. |
| 6,628,732 B1 | 9/2003 | Takaki |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,675,294 B1 | 1/2004 | Gupta et al. |
| 6,678,509 B2 | 1/2004 | Skarman et al. |
| 6,687,437 B1 | 2/2004 | Starnes et al. |
| 6,690,328 B2 | 2/2004 | Judd |
| 6,704,298 B1 | 3/2004 | Matsumiya et al. |
| 6,704,545 B1 | 3/2004 | Wala |
| 6,710,366 B1 | 3/2004 | Lee et al. |
| 6,714,800 B2 | 3/2004 | Johnson et al. |
| 6,731,880 B2 | 5/2004 | Westbrook et al. |
| 6,745,013 B1 | 6/2004 | Porter et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,823,174 B1 | 11/2004 | Masenten et al. |
| 6,826,163 B2 | 11/2004 | Mani et al. |
| 6,826,337 B2 | 11/2004 | Linnell |
| 6,836,660 B1 | 12/2004 | Wala |
| 6,836,673 B1 | 12/2004 | Trott |
| 6,842,433 B2 | 1/2005 | West et al. |
| 6,847,856 B1 | 1/2005 | Bohannon |
| 6,850,510 B2 | 2/2005 | Kubler et al. |
| 6,865,390 B2 | 3/2005 | Goss et al. |
| 6,873,823 B2 | 3/2005 | Hasarchi et al. |
| 6,876,056 B2 | 4/2005 | Tilmans et al. |
| 6,876,945 B2 | 4/2005 | Emord ............... 702/150 |
| 6,879,290 B1 | 4/2005 | Toutain et al. |
| 6,882,311 B2 | 4/2005 | Walker et al. |
| 6,883,710 B2 | 4/2005 | Chung |
| 6,885,344 B2 | 4/2005 | Mohamadi |
| 6,885,846 B1 | 4/2005 | Panasik et al. |
| 6,889,060 B2 | 5/2005 | Fernando et al. |
| 6,909,399 B1 | 6/2005 | Zegelin et al. ............... 342/463 |
| 6,915,058 B2 | 7/2005 | Pons |
| 6,915,529 B1 | 7/2005 | Suematsu et al. |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,931,659 B1 | 8/2005 | Kinemura |
| 6,933,849 B2 | 8/2005 | Sawyer |
| 6,934,511 B1 | 8/2005 | Lovinggood et al. |
| 6,934,541 B2 | 8/2005 | Miyatani |
| 6,941,112 B2 | 9/2005 | Hasegawa |
| 6,946,989 B2 | 9/2005 | Vavik |
| 6,952,181 B2 | 10/2005 | Karr et al. ............... 342/457 |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,967,347 B2 | 11/2005 | Estes et al. |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 6,977,502 B1 | 12/2005 | Hertz |
| 7,002,511 B1 | 2/2006 | Ammar et al. |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,020,473 B2 | 3/2006 | Splett |
| 7,020,488 B1 | 3/2006 | Bleile et al. |
| 7,024,166 B2 | 4/2006 | Wallace et al. |
| 7,035,512 B2 | 4/2006 | Van Bijsterveld |
| 7,039,399 B2 | 5/2006 | Fischer |
| 7,043,271 B1 | 5/2006 | Seto et al. |
| 7,047,028 B2 | 5/2006 | Cagenius |
| 7,050,017 B2 | 5/2006 | King et al. |
| 7,053,838 B2 | 5/2006 | Judd |
| 7,054,513 B2 | 5/2006 | Herz et al. |
| 7,069,577 B2 | 6/2006 | Geile et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,093,985 B2 | 8/2006 | Lord et al. |
| 7,103,119 B2 | 9/2006 | Matsuoka et al. |
| 7,103,377 B2 | 9/2006 | Bauman et al. |
| 7,106,931 B2 | 9/2006 | Sutehall et al. |
| 7,110,795 B2 | 9/2006 | Doi |
| 7,114,859 B1 | 10/2006 | Tuohimaa et al. |
| 7,127,176 B2 | 10/2006 | Sasaki |
| 7,142,503 B1 | 11/2006 | Grant et al. |
| 7,142,535 B2 | 11/2006 | Kubler et al. |
| 7,142,619 B2 | 11/2006 | Sommer et al. |
| 7,160,032 B2 | 1/2007 | Nagashima et al. |
| 7,171,244 B2 | 1/2007 | Bauman |
| 7,184,728 B2 | 2/2007 | Solum |
| 7,190,748 B2 | 3/2007 | Kim et al. |
| 7,194,023 B2 | 3/2007 | Norrell et al. |
| 7,194,275 B2 | 3/2007 | Bolin et al. ............... 455/456.6 |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,263,293 B2 | 8/2007 | Ommodt et al. |
| 7,269,311 B2 | 9/2007 | Kim et al. |
| 7,280,011 B2 | 10/2007 | Bayar et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,298,327 B2 | 11/2007 | Dupray et al. ............... 342/451 |
| 7,310,430 B1 | 12/2007 | Mallya et al. |

(56) References Cited

U.S. PATENT DOCUMENTS

| | | | |
|---|---|---|---|
| 7,313,415 B2 | 12/2007 | Wake et al. | |
| 7,315,735 B2 | 1/2008 | Graham | |
| 7,324,730 B2 | 1/2008 | Varkey et al. | |
| 7,336,961 B1 | 2/2008 | Ngan | 455/456.1 |
| 7,343,164 B2 | 3/2008 | Kallstenius | |
| 7,348,843 B1 | 3/2008 | Qiu et al. | |
| 7,349,633 B2 | 3/2008 | Lee et al. | |
| 7,359,408 B2 | 4/2008 | Kim | |
| 7,359,674 B2 | 4/2008 | Markki et al. | |
| 7,366,150 B2 | 4/2008 | Lee et al. | |
| 7,366,151 B2 | 4/2008 | Kubler et al. | |
| 7,369,526 B2 | 5/2008 | Lechleider et al. | |
| 7,379,669 B2 | 5/2008 | Kim | |
| 7,388,892 B2 | 6/2008 | Nishiyama et al. | |
| 7,392,025 B2 | 6/2008 | Rooyen et al. | |
| 7,392,029 B2 | 6/2008 | Pronkine | |
| 7,394,883 B2 | 7/2008 | Funakubo et al. | |
| 7,395,181 B2 | 7/2008 | Foxlin | 702/155 |
| 7,403,156 B2 | 7/2008 | Coppi et al. | |
| 7,409,159 B2 | 8/2008 | Izadpanah | |
| 7,412,224 B2 | 8/2008 | Kotola et al. | |
| 7,424,228 B1 | 9/2008 | Williams et al. | |
| 7,444,051 B2 | 10/2008 | Tatat et al. | |
| 7,450,853 B2 | 11/2008 | Kim et al. | |
| 7,450,854 B2 | 11/2008 | Lee et al. | |
| 7,451,365 B2 | 11/2008 | Wang et al. | |
| 7,454,222 B2 | 11/2008 | Huang et al. | |
| 7,460,507 B2 | 12/2008 | Kubler et al. | |
| 7,460,829 B2 | 12/2008 | Utsumi et al. | |
| 7,460,831 B2 | 12/2008 | Hasarchi | |
| 7,466,925 B2 | 12/2008 | Iannelli | |
| 7,469,105 B2 | 12/2008 | Wake et al. | |
| 7,477,597 B2 | 1/2009 | Segel | |
| 7,483,504 B2 | 1/2009 | Shapira et al. | |
| 7,483,711 B2 | 1/2009 | Burchfiel | |
| 7,496,070 B2 | 2/2009 | Vesuna | |
| 7,496,384 B2 | 2/2009 | Seto et al. | |
| 7,505,747 B2 | 3/2009 | Solum | |
| 7,512,419 B2 | 3/2009 | Solum | |
| 7,522,552 B2 | 4/2009 | Fein et al. | |
| 7,525,484 B2 | 4/2009 | Dupray et al. | 342/450 |
| 7,539,509 B2 | 5/2009 | Bauman et al. | |
| 7,542,452 B2 | 6/2009 | Penumetsa | |
| 7,546,138 B2 | 6/2009 | Bauman | |
| 7,548,138 B2 | 6/2009 | Kamgaing | |
| 7,548,695 B2 | 6/2009 | Wake | |
| 7,551,641 B2 | 6/2009 | Pirzada et al. | |
| 7,557,758 B2 | 7/2009 | Rofougaran | |
| 7,580,384 B2 | 8/2009 | Kubler et al. | |
| 7,586,861 B2 | 9/2009 | Kubler et al. | |
| 7,590,354 B2 | 9/2009 | Sauer et al. | |
| 7,593,704 B2 | 9/2009 | Pinel et al. | |
| 7,599,420 B2 | 10/2009 | Forenza et al. | |
| 7,599,672 B2 | 10/2009 | Shoji et al. | |
| 7,610,046 B2 | 10/2009 | Wala | |
| 7,630,690 B2 | 12/2009 | Kaewell, Jr. et al. | |
| 7,633,934 B2 | 12/2009 | Kubler et al. | |
| 7,639,982 B2 | 12/2009 | Wala | |
| 7,646,743 B2 | 1/2010 | Kubler et al. | |
| 7,646,777 B2 | 1/2010 | Hicks, III et al. | |
| 7,653,397 B2 | 1/2010 | Pernu et al. | |
| 7,668,565 B2 | 2/2010 | Ylänen et al. | |
| 7,688,811 B2 | 3/2010 | Kubler et al. | |
| 7,693,486 B2 | 4/2010 | Kasslin et al. | |
| 7,697,467 B2 | 4/2010 | Kubler et al. | |
| 7,697,574 B2 | 4/2010 | Suematsu et al. | |
| 7,714,778 B2 | 5/2010 | Dupray | 342/357.01 |
| 7,715,375 B2 | 5/2010 | Kubler et al. | |
| 7,751,374 B2 | 7/2010 | Donovan | |
| 7,751,838 B2 | 7/2010 | Ramesh et al. | |
| 7,760,703 B2 | 7/2010 | Kubler et al. | |
| 7,764,231 B1 | 7/2010 | Karr et al. | 342/457 |
| 7,768,951 B2 | 8/2010 | Kubler et al. | |
| 7,773,573 B2 | 8/2010 | Chung et al. | |
| 7,778,603 B2 | 8/2010 | Palin et al. | |
| 7,787,823 B2 | 8/2010 | George et al. | |
| 7,809,012 B2 | 10/2010 | Ruuska et al. | |
| 7,812,766 B2 | 10/2010 | Leblanc et al. | |
| 7,812,775 B2 | 10/2010 | Babakhani et al. | |
| 7,817,969 B2 | 10/2010 | Castaneda et al. | |
| 7,835,328 B2 | 11/2010 | Stephens et al. | |
| 7,848,316 B2 | 12/2010 | Kubler et al. | |
| 7,848,770 B2 | 12/2010 | Scheinert | |
| 7,853,234 B2 | 12/2010 | Afsahi | |
| 7,860,518 B2 | 12/2010 | Flanagan et al. | 455/456.1 |
| 7,870,321 B2 | 1/2011 | Rofougaran | |
| 7,880,677 B2 | 2/2011 | Rofougaran et al. | |
| 7,881,755 B1 | 2/2011 | Mishra et al. | |
| 7,894,423 B2 | 2/2011 | Kubler et al. | |
| 7,899,007 B2 | 3/2011 | Kubler et al. | |
| 7,903,029 B2 | 3/2011 | Dupray | 342/457 |
| 7,907,972 B2 | 3/2011 | Walton et al. | |
| 7,912,043 B2 | 3/2011 | Kubler et al. | |
| 7,912,506 B2 | 3/2011 | Lovberg et al. | |
| 7,916,706 B2 | 3/2011 | Kubler et al. | |
| 7,917,177 B2 | 3/2011 | Bauman | |
| 7,920,553 B2 | 4/2011 | Kubler et al. | |
| 7,920,858 B2 | 4/2011 | Sabat, Jr. et al. | |
| 7,924,783 B1 | 4/2011 | Mahany et al. | |
| 7,936,713 B2 | 5/2011 | Kubler et al. | |
| 7,949,364 B2 | 5/2011 | Kasslin et al. | |
| 7,957,777 B1 | 6/2011 | Vu et al. | |
| 7,962,111 B2 | 6/2011 | Solum | |
| 7,969,009 B2 | 6/2011 | Chandrasekaran | |
| 7,969,911 B2 | 6/2011 | Mahany et al. | |
| 7,990,925 B2 | 8/2011 | Tinnakornsrisuphap et al. | |
| 7,996,020 B1 | 8/2011 | Chhabra | |
| 8,005,050 B2 | 8/2011 | Scheinert et al. | 370/335 |
| 8,018,907 B2 | 9/2011 | Kubler et al. | |
| 8,023,886 B2 | 9/2011 | Rofougaran | |
| 8,027,656 B2 | 9/2011 | Rofougaran et al. | |
| 8,032,153 B2 | 10/2011 | Dupray et al. | 455/456.1 |
| 8,036,308 B2 | 10/2011 | Rofougaran | |
| 8,072,381 B1 | 12/2011 | Ziegler | 342/386 |
| 8,081,923 B1 | 12/2011 | Larsen et al. | 455/18 |
| 8,082,096 B2 | 12/2011 | Dupray | 701/207 |
| 8,082,353 B2 | 12/2011 | Huber et al. | |
| 8,086,192 B2 | 12/2011 | Rofougaran et al. | |
| 8,135,413 B2 | 3/2012 | Dupray | 455/456.1 |
| 2001/0036199 A1 | 11/2001 | Terry | |
| 2002/0003645 A1 | 1/2002 | Kim et al. | |
| 2002/0012495 A1 | 1/2002 | Sasai et al. | |
| 2002/0048071 A1 | 4/2002 | Suzuki et al. | |
| 2002/0051434 A1 | 5/2002 | Ozluturk et al. | |
| 2002/0075906 A1 | 6/2002 | Cole et al. | |
| 2002/0092347 A1 | 7/2002 | Niekerk et al. | |
| 2002/0111149 A1 | 8/2002 | Shoki | |
| 2002/0111192 A1 | 8/2002 | Thomas et al. | |
| 2002/0114038 A1 | 8/2002 | Arnon et al. | |
| 2002/0123365 A1 | 9/2002 | Thorson et al. | |
| 2002/0126967 A1 | 9/2002 | Panak et al. | |
| 2002/0128009 A1 | 9/2002 | Boch et al. | |
| 2002/0130778 A1 | 9/2002 | Nicholson | |
| 2002/0181668 A1 | 12/2002 | Masoian et al. | |
| 2002/0190845 A1 | 12/2002 | Moore | |
| 2003/0007214 A1 | 1/2003 | Aburakawa et al. | |
| 2003/0016418 A1 | 1/2003 | Westbrook et al. | |
| 2003/0045284 A1 | 3/2003 | Copley et al. | |
| 2003/0078074 A1 | 4/2003 | Sesay et al. | |
| 2003/0141962 A1 | 7/2003 | Barink | |
| 2003/0146871 A1 | 8/2003 | Karr et al. | 342/457 |
| 2003/0157943 A1 | 8/2003 | Sabat, Jr. | 455/456 |
| 2003/0161637 A1 | 8/2003 | Yamamoto et al. | |
| 2003/0165287 A1 | 9/2003 | Krill et al. | |
| 2003/0174099 A1 | 9/2003 | Bauer et al. | |
| 2003/0209601 A1 | 11/2003 | Chung | |
| 2004/0001719 A1 | 1/2004 | Sasaki | |
| 2004/0008114 A1 | 1/2004 | Sawyer | |
| 2004/0017785 A1 | 1/2004 | Zelst | |
| 2004/0041714 A1 | 3/2004 | Forster | |
| 2004/0043764 A1 | 3/2004 | Bigham et al. | |
| 2004/0047313 A1 | 3/2004 | Rumpf et al. | |
| 2004/0078151 A1 | 4/2004 | Aljadeff et al. | |
| 2004/0095907 A1 | 5/2004 | Agee et al. | |

(56) References Cited

U.S. PATENT DOCUMENTS

| | | |
|---|---|---|
| 2004/0100930 A1 | 5/2004 | Shapira et al. |
| 2004/0102196 A1 | 5/2004 | Weckstrom et al. ........ 454/456.1 |
| 2004/0126068 A1 | 7/2004 | Van Bijsterveld |
| 2004/0139477 A1 | 7/2004 | Russell et al. |
| 2004/0146020 A1 | 7/2004 | Kubler et al. |
| 2004/0149736 A1 | 8/2004 | Clothier |
| 2004/0151164 A1 | 8/2004 | Kubler et al. |
| 2004/0151503 A1 | 8/2004 | Kashima et al. |
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162115 A1 | 8/2004 | Smith et al. |
| 2004/0162116 A1 | 8/2004 | Han et al. |
| 2004/0165573 A1 | 8/2004 | Kubler et al. |
| 2004/0175173 A1 | 9/2004 | Deas |
| 2004/0196404 A1 | 10/2004 | Loheit et al. |
| 2004/0198386 A1 | 10/2004 | Dupray ...................... 455/456.1 |
| 2004/0202257 A1 | 10/2004 | Mehta et al. |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0218873 A1 | 11/2004 | Nagashima et al. |
| 2004/0233877 A1 | 11/2004 | Lee et al. |
| 2004/0258105 A1 | 12/2004 | Spathas et al. |
| 2005/0020309 A1 | 1/2005 | Moeglein et al. .......... 455/456.1 |
| 2005/0052287 A1 | 3/2005 | Whitesmith et al. |
| 2005/0058451 A1 | 3/2005 | Ross |
| 2005/0064877 A1* | 3/2005 | Gum et al. ................. 455/456.1 |
| 2005/0068179 A1 | 3/2005 | Roesner |
| 2005/0076982 A1 | 4/2005 | Metcalf et al. |
| 2005/0078006 A1 | 4/2005 | Hutchins et al. |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0141545 A1 | 6/2005 | Fein et al. |
| 2005/0143077 A1 | 6/2005 | Charbonneau |
| 2005/0143091 A1 | 6/2005 | Shapira et al. ............. 455/456.1 |
| 2005/0147071 A1 | 7/2005 | Karaoguz et al. |
| 2005/0148306 A1 | 7/2005 | Hiddink |
| 2005/0153712 A1 | 7/2005 | Osaka et al. ................ 455/456.5 |
| 2005/0159108 A1 | 7/2005 | Fletcher et al. |
| 2005/0174236 A1 | 8/2005 | Brookner |
| 2005/0201761 A1 | 9/2005 | Bartur et al. |
| 2005/0219050 A1 | 10/2005 | Martin |
| 2005/0224585 A1 | 10/2005 | Durrant et al. |
| 2005/0226625 A1 | 10/2005 | Wake et al. |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2005/0272439 A1 | 12/2005 | Picciriello et al. |
| 2006/0002326 A1 | 1/2006 | Vesuna |
| 2006/0014548 A1 | 1/2006 | Bolin et al. ................. 455/456.1 |
| 2006/0017633 A1 | 1/2006 | Pronkine |
| 2006/0025158 A1 | 2/2006 | Leblanc et al. ............ 455/456.2 |
| 2006/0045054 A1 | 3/2006 | Utsumi et al. |
| 2006/0056327 A1 | 3/2006 | Coersmeier |
| 2006/0062579 A1 | 3/2006 | Kim et al. |
| 2006/0094470 A1 | 5/2006 | Wake et al. |
| 2006/0104643 A1 | 5/2006 | Lee et al. |
| 2006/0159388 A1 | 7/2006 | Kawase et al. |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0209752 A1 | 9/2006 | Wijngaarden et al. ......... 370/328 |
| 2006/0223439 A1 | 10/2006 | Pinel et al. |
| 2006/0233506 A1 | 10/2006 | Noonan et al. |
| 2006/0239630 A1 | 10/2006 | Hase et al. |
| 2006/0274704 A1 | 12/2006 | Desai et al. |
| 2006/0276202 A1 | 12/2006 | Moeglein et al. .......... 455/456.1 |
| 2007/0009266 A1 | 1/2007 | Bothwell et al. |
| 2007/0054682 A1 | 3/2007 | Fanning et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0104128 A1 | 5/2007 | Laroia et al. .................. 370/329 |
| 2007/0104164 A1 | 5/2007 | Laroia et al. .................. 370/338 |
| 2007/0140168 A1 | 6/2007 | Laroia et al. .................. 370/330 |
| 2007/0149250 A1 | 6/2007 | Crozzoli et al. |
| 2007/0166042 A1 | 7/2007 | Seeds et al. |
| 2007/0224954 A1 | 9/2007 | Gopi |
| 2007/0243899 A1 | 10/2007 | Hermel et al. |
| 2007/0248358 A1 | 10/2007 | Sauer |
| 2007/0253355 A1 | 11/2007 | Hande et al. .................. 371/328 |
| 2007/0253714 A1 | 11/2007 | Seeds et al. |
| 2007/0257796 A1 | 11/2007 | Easton et al. |
| 2007/0265775 A1* | 11/2007 | Tsai et al. ..................... 701/213 |
| 2007/0268846 A1 | 11/2007 | Proctor, Jr. et al. |
| 2007/0268853 A1 | 11/2007 | Ma et al. ....................... 370/328 |
| 2007/0274279 A1 | 11/2007 | Wood et al. |
| 2007/0292143 A1 | 12/2007 | Yu et al. |
| 2007/0297005 A1 | 12/2007 | Montierth et al. |
| 2008/0002652 A1 | 1/2008 | Gupta et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0056167 A1 | 3/2008 | Kim et al. |
| 2008/0058018 A1 | 3/2008 | Scheinert |
| 2008/0063397 A1 | 3/2008 | Hu et al. |
| 2008/0077326 A1 | 3/2008 | Funk et al. ..................... 701/220 |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0119208 A1 | 5/2008 | Flanagan et al. ........... 455/456.6 |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0167049 A1 | 7/2008 | Karr et al. .................... 455/456.2 |
| 2008/0194226 A1 | 8/2008 | Rivas et al. .................. 455/404.2 |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232799 A1 | 9/2008 | Kim |
| 2008/0247716 A1 | 10/2008 | Thomas et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310464 A1 | 12/2008 | Schneider |
| 2008/0310848 A1 | 12/2008 | Yasuda et al. |
| 2008/0311876 A1 | 12/2008 | Leenaerts et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0073916 A1 | 3/2009 | Zhang et al. |
| 2009/0088071 A1 | 4/2009 | Rofougaran |

(56) References Cited

U.S. PATENT DOCUMENTS

| | | | |
|---|---|---|---|
| 2009/0135078 A1 | 5/2009 | Lindmark et al. | |
| 2009/0141780 A1 | 6/2009 | Cruz-Albrecht et al. | |
| 2009/0149221 A1 | 6/2009 | Liu et al. | |
| 2009/0154621 A1 | 6/2009 | Shapira et al. | |
| 2009/0163224 A1 | 6/2009 | Dean et al. | 455/456.1 |
| 2009/0175214 A1 | 7/2009 | Sfar et al. | |
| 2009/0176507 A1 | 7/2009 | Wu et al. | 455/456.2 |
| 2009/0191891 A1 | 7/2009 | Ma et al. | 455/456.1 |
| 2009/0218407 A1 | 9/2009 | Rofougaran | |
| 2009/0218657 A1 | 9/2009 | Rofougaran | |
| 2009/0237317 A1 | 9/2009 | Rofougaran | |
| 2009/0245084 A1 | 10/2009 | Moffatt et al. | |
| 2009/0245153 A1 | 10/2009 | Li et al. | |
| 2009/0245221 A1 | 10/2009 | Piipponen | |
| 2009/0247109 A1 | 10/2009 | Rofougaran | |
| 2009/0252136 A1 | 10/2009 | Mahany et al. | |
| 2009/0252205 A1 | 10/2009 | Rheinfelder et al. | |
| 2009/0258652 A1 | 10/2009 | Lambert et al. | |
| 2009/0278596 A1 | 11/2009 | Rofougaran et al. | |
| 2009/0279593 A1 | 11/2009 | Rofougaran et al. | |
| 2009/0285147 A1 | 11/2009 | Subasic et al. | |
| 2010/0002626 A1 | 1/2010 | Schmidt et al. | |
| 2010/0007485 A1 | 1/2010 | Kodrin et al. | 340/539.13 |
| 2010/0027443 A1 | 2/2010 | LoGalbo et al. | |
| 2010/0056200 A1 | 3/2010 | Tolonen | |
| 2010/0080154 A1 | 4/2010 | Noh et al. | |
| 2010/0080182 A1 | 4/2010 | Kubler et al. | |
| 2010/0091475 A1 | 4/2010 | Toms et al. | |
| 2010/0118864 A1 | 5/2010 | Kubler et al. | |
| 2010/0127937 A1 | 5/2010 | Chandrasekaran et al. | |
| 2010/0128568 A1 | 5/2010 | Han et al. | 367/99 |
| 2010/0134257 A1 | 6/2010 | Puleston et al. | |
| 2010/0142598 A1 | 6/2010 | Murray et al. | |
| 2010/0142955 A1 | 6/2010 | Yu et al. | |
| 2010/0144285 A1 | 6/2010 | Behzad et al. | |
| 2010/0148373 A1 | 6/2010 | Chandrasekaran | |
| 2010/0156721 A1 | 6/2010 | Alamouti et al. | |
| 2010/0159859 A1 | 6/2010 | Rofougaran | |
| 2010/0178936 A1 | 7/2010 | Wala et al. | 455/456.2 |
| 2010/0188998 A1 | 7/2010 | Pernu et al. | |
| 2010/0190509 A1 | 7/2010 | Davis | |
| 2010/0202326 A1 | 8/2010 | Rofougaran et al. | |
| 2010/0225413 A1 | 9/2010 | Rofougaran et al. | |
| 2010/0225520 A1 | 9/2010 | Mohamadi et al. | |
| 2010/0225556 A1 | 9/2010 | Rofougaran et al. | |
| 2010/0225557 A1 | 9/2010 | Rofougaran et al. | |
| 2010/0232323 A1 | 9/2010 | Kubler et al. | |
| 2010/0234045 A1 | 9/2010 | Karr et al. | 455/456.1 |
| 2010/0246558 A1 | 9/2010 | Harel | |
| 2010/0255774 A1 | 10/2010 | Kenington | |
| 2010/0258949 A1 | 10/2010 | Henderson et al. | |
| 2010/0260063 A1 | 10/2010 | Kubler et al. | |
| 2010/0261501 A1 | 10/2010 | Behzad et al. | |
| 2010/0273504 A1 | 10/2010 | Bull et al. | 455/456.1 |
| 2010/0284323 A1 | 11/2010 | Tang et al. | |
| 2010/0290355 A1 | 11/2010 | Roy et al. | |
| 2010/0291949 A1 | 11/2010 | Shapira et al. | 455/456.1 |
| 2010/0309049 A1 | 12/2010 | Reunamäki et al. | |
| 2010/0311472 A1 | 12/2010 | Rofougaran et al. | |
| 2010/0311480 A1 | 12/2010 | Raines et al. | |
| 2010/0329161 A1 | 12/2010 | Ylanen et al. | |
| 2010/0329166 A1 | 12/2010 | Mahany et al. | |
| 2011/0007724 A1 | 1/2011 | Mahany et al. | |
| 2011/0007733 A1 | 1/2011 | Kubler et al. | |
| 2011/0019999 A1 | 1/2011 | George et al. | |
| 2011/0021146 A1 | 1/2011 | Pernu | |
| 2011/0021224 A1 | 1/2011 | Koskinen et al. | |
| 2011/0026932 A1 | 2/2011 | Yeh et al. | |
| 2011/0028157 A1 | 2/2011 | Larsen | 455/456.1 |
| 2011/0028161 A1 | 2/2011 | Larsen | 455/456.1 |
| 2011/0050501 A1 | 3/2011 | Aljadeff | 342/387 |
| 2011/0065450 A1 | 3/2011 | Kazmi | |
| 2011/0066774 A1 | 3/2011 | Rofougaran | |
| 2011/0069668 A1 | 3/2011 | Chion et al. | |
| 2011/0071734 A1 | 3/2011 | Van Wiemeersch et al. | |
| 2011/0086614 A1 | 4/2011 | Brisebois et al. | |
| 2011/0116572 A1 | 5/2011 | Lee et al. | |
| 2011/0122912 A1 | 5/2011 | Benjamin et al. | |
| 2011/0124347 A1 | 5/2011 | Chen et al. | 455/456.1 |
| 2011/0126071 A1 | 5/2011 | Han et al. | |
| 2011/0149879 A1 | 6/2011 | Noriega et al. | |
| 2011/0158298 A1 | 6/2011 | Djadi et al. | |
| 2011/0159876 A1 | 6/2011 | Segall et al. | 45/442 |
| 2011/0159891 A1 | 6/2011 | Segall et al. | 455/456.3 |
| 2011/0171912 A1 | 7/2011 | Beck et al. | 455/67.11 |
| 2011/0171946 A1 | 7/2011 | Soehren | 455/418 |
| 2011/0171973 A1 | 7/2011 | Beck et al. | 455/456.2 |
| 2011/0182230 A1 | 7/2011 | Ohm et al. | |
| 2011/0194475 A1 | 8/2011 | Kim et al. | |
| 2011/0201368 A1 | 8/2011 | Faccin et al. | |
| 2011/0204504 A1 | 8/2011 | Henderson et al. | |
| 2011/0206383 A1 | 8/2011 | Chien et al. | |
| 2011/0210843 A1 | 9/2011 | Kummetz | 340/517 |
| 2011/0211439 A1 | 9/2011 | Manpuria et al. | |
| 2011/0215901 A1 | 9/2011 | Van Wiemeersch et al. | |
| 2011/0222415 A1 | 9/2011 | Ramamurthi et al. | |
| 2011/0222434 A1 | 9/2011 | Chen | |
| 2011/0222619 A1 | 9/2011 | Ramamurthi et al. | |
| 2011/0227795 A1 | 9/2011 | Lopez et al. | |
| 2011/0244887 A1 | 10/2011 | Dupray et al. | |
| 2011/0256878 A1 | 10/2011 | Zhu et al. | |
| 2011/0268033 A1 | 11/2011 | Boldi et al. | |
| 2011/0274021 A1 | 11/2011 | He et al. | |
| 2011/0281536 A1 | 11/2011 | Lee et al. | |
| 2011/0321340 A1 | 12/2011 | Wu et al. | 455/456.1 |
| 2012/0039320 A1 | 2/2012 | Lemson et al. | 370/338 |
| 2012/0058775 A1 | 3/2012 | Dupray et al. | 455/456.1 |
| 2012/0081248 A1 | 4/2012 | Kennedy et al. | 342/118 |
| 2012/0087212 A1 | 4/2012 | Vartanian et al. | 367/118 |
| 2012/0130632 A1 | 5/2012 | Bandyopadhyay et al. | 701/446 |

FOREIGN PATENT DOCUMENTS

| | | |
|---|---|---|
| CA | 2065090 C | 4/1992 |
| CA | 2242707 | 9/2002 |
| DE | 20104862 U1 | 9/2001 |
| DE | 10249414 A1 | 5/2004 |
| EP | 0477952 A2 | 4/1992 |
| EP | 0461583 B1 | 3/1997 |
| EP | 0851618 A2 | 7/1998 |
| EP | 0687400 B1 | 11/1998 |
| EP | 0993124 A2 | 4/2000 |
| EP | 1037411 A2 | 9/2000 |
| EP | 1267447 B1 | 1/2001 |
| EP | 1179895 A1 | 2/2002 |
| EP | 1202475 A1 | 5/2002 |
| EP | 1227605 A2 | 7/2002 |
| EP | 1267447 A1 | 12/2002 |
| EP | 1347584 A2 | 9/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1530316 A1 | 5/2005 |
| EP | 1511203 B1 | 3/2006 |
| EP | 1693974 A1 | 8/2006 |
| EP | 1742388 A1 | 1/2007 |
| EP | 1227605 B1 | 1/2008 |
| EP | 1954019 A1 | 8/2008 |
| EP | 1968250 A1 | 9/2008 |
| EP | 1056226 B1 | 4/2009 |
| EP | 1357683 B1 | 5/2009 |
| GB | 2323252 A | 9/1998 |
| GB | 2399963 A | 9/2004 |
| GB | 2428149 A | 1/2007 |
| JP | 05260018 | 10/1993 |
| JP | 09083450 | 3/1997 |
| JP | 09162810 | 6/1997 |
| JP | 09200840 A | 7/1997 |
| JP | 11068675 | 3/1999 |
| JP | 2000152300 | 5/2000 |
| JP | 2000341744 | 12/2000 |

(56) References Cited

FOREIGN PATENT DOCUMENTS

| | | |
|---|---|---|
| JP | 2002264617 | 9/2002 |
| JP | 2002353813 A | 12/2002 |
| JP | 2003148653 | 5/2003 |
| JP | 2003172827 | 6/2003 |
| JP | 2004172734 | 6/2004 |
| JP | 2004245963 | 9/2004 |
| JP | 2004247090 | 9/2004 |
| JP | 2004264901 | 9/2004 |
| JP | 2004265624 | 9/2004 |
| JP | 2004317737 | 11/2004 |
| JP | 2004349184 | 12/2004 |
| JP | 2005018175 | 1/2005 |
| JP | 2005087135 | 4/2005 |
| JP | 2005134125 | 5/2005 |
| JP | 2007228603 | 9/2007 |
| JP | 2008172597 | 7/2008 |
| JP | 2009288245 | 12/2009 |
| WO | 9603823 A1 | 2/1996 |
| WO | 9810600 A1 | 3/1998 |
| WO | 0042721 A1 | 7/2000 |
| WO | 0072475 A1 | 11/2000 |
| WO | 0178434 A1 | 10/2001 |
| WO | 0184760 A1 | 11/2001 |
| WO | 0221183 A1 | 3/2002 |
| WO | 0230141 A1 | 4/2002 |
| WO | 02102102 A1 | 12/2002 |
| WO | 03024027 A1 | 3/2003 |
| WO | 03098175 A1 | 11/2003 |
| WO | 2004030154 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2005062505 A1 | 7/2005 |
| WO | 2005069203 A2 | 7/2005 |
| WO | 2005073897 A1 | 8/2005 |
| WO | 2005079386 A2 | 9/2005 |
| WO | 2005101701 A2 | 10/2005 |
| WO | 2005111959 A2 | 11/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006051262 A1 | 5/2006 |
| WO | 2006060754 A2 | 6/2006 |
| WO | 2006133609 A1 | 12/2006 |
| WO | 2006136811 A1 | 12/2006 |
| WO | 2007048427 A1 | 5/2007 |
| WO | 2007077451 A1 | 7/2007 |
| WO | 2007088561 A1 | 8/2007 |
| WO | 2007091026 A1 | 8/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | WO2008/099383 A2 | 8/2008 |
| WO | WO2008/099390 A3 | 8/2008 |
| WO | 2006046088 A1 | 5/2009 |
| WO | WO2009/081376 A3 | 7/2009 |
| WO | WO2009/097237 A1 | 8/2009 |
| WO | 2010090999 A1 | 8/2010 |
| WO | WO2011/017700 A1 | 2/2011 |
| WO | WO2011/091859 A1 | 8/2011 |
| WO | WO2011/123336 A1 | 10/2011 |

OTHER PUBLICATIONS

Bakaul., M., Nirmalathas, A., Lim, C., Novak, D., and Waterhouse, R., "Efficient Multiplexing Scheme for Wavelength-Interleaved DWDM Millimeter-Wave Fiber-Radio Systems," IEEE Photonics Technology Letters, vol. 17, No. 12, Dec. 2005.

D. Huang, C. Chiu, "A WLAN-Used Helical Antenna Fully Integrated with the PCMCIA Carrier," IEEE Trans. Ant. And Prop., vol. 53, No. 12, pp. 4164-4168, Dec. 2005.

Opatic, D., "Radio over Fiber Technology for Wireless Access," Oct. 17, 2009, 6 pages.

International Telecommunication Union, ITU-T G.652, Telecommunication Standardization Sector of ITU, Jun. 2005, Series G: Transmission Systems and Media, Digital Systems and Networks, Transmission Media and Optical Systems Characteristics—Optical Fibre Cables, Characteristics of a Single-Mode Optical Fiber abd Cable, ITU-T Recommendation G.652, 22 pages.

International Telecommunication Union, ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network, ITU-T Recommendation G.657, 20 pages.

Kojucharow, K. et al., "Millimeter-Wave Signal Properties Resulting from Electrooptical Upconversion," IEEE Transaction on Microwave Theory and Techniques, vol. 49, No. 10, Oct. 2001, pp. 1977-1985.

Monro et al., "Holey Fibers with Random Cladding Distributions," Optics Letters, vol. 25, No. 4, Feb. 15, 2000.

Niiho, T., Nakaso, M., Sasai, H., Utsumi, K., and Fuse, M., "Multi-Channel Wireless LAN Distributed Antenna System Based on Radio-Over-Fiber Techniques," Lasers and Electro-Optics Society 2004, LEOS 2004, The 17th Annual Meeting of the IEEE, vol. 1, Nov. 7-11, 2004, pp. 57-58, vol. 1.

Paulraj, A., Gore, D., Nabar, R., and Bolcskei, H., "An Overview of MIMO Communications—A Key to Gigabit Wireless," Proceedings of the IEEE, vol. 92, No. 2, Feb. 2004.

Roh, W. and Paulraj, A., "MIMO Channel Capacity for the Disctributed Antenna Systems," Vehicular Technology Conference, 2002, proceedings, VTC 2002-Fall, 2002 IEEE 56th, vol. 2, Sep. 24-28, 2002, pp. 706-709, vol. 2.

Shen, C., Zhou, S., and Yao, Y., "Comparison of Channel Capacity for MIMO-DAS versus MIMO-CAS," Communications, 2003, APCC 2003, The 9th Asia-Pacific Conference, vol. 1, Sep. 21-24, 2003, pp. 113-118, vol. 1.

Wake, D. et al., "Passive Picocell: A New Concept n Wireless Network Infrastructure," Electronics Letters, vol. 33, No. 5, Feb. 27, 1997, pp. 404-406.

Winters, J., Salz, J., and Gitlin, R., "The Impact of Antenna Diversity on the Capacity of Wireless Communications Systems," IEEE Transcations on Communications, vol. 42, No. 2/3/4, Feb./Mar./Apr. 1994.

Second Office Action for Chinese patent application 20078002293.6 mailed Aug. 30, 2012, 10 pages.

Girard, et al., Indoor Pedestrian Navigation Using Foot-Mounted IMU and Portable Ultrasound Range Sensors, www.mdpi.com/journal/sensors, Aug. 2, 2011, pp. 7606-7624.

Kim, et al, "Smartphone-Based Collaborative and Autonomous Radio Fingerprinting," IEEE Transactions on Systems, Man, and Cybernetics—Part C: Applications and Reviews, vol. 42, No. 1, Jan. 2012, pp. 112-122.

Decision on Rejection for Chinese patent application 200780022093.6 mailed Feb. 5, 2013, 9 pages.

Mokni, et al., "Coupled Sonar Inertial Navigation System for Pedestrian Tracking," International Conference on Information Fusion, 2010, 8 pages.

"Safe Campus Solutions: Going Beyond Emergency Notification," www.alcatel-lucent.com, Sep. 2008, 8 pages.

"Cellular Specialties Introduces the First Simulcasted In-building Location-Based Tracking Solution," http://smart-grid.tmcnet.com/news/2009/09/1414368300.htm, Sep. 2009, 2 pages.

Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.

Cho, Bong Youl et al. "The Forward Link Performance of a PCS System with an AGC," 4th CDMA International Conference and Exhibition, "The Realization of IMT-2000," 1999, 10 pages.

Chu, Ta-Shing et al. "Fiber optic microcellular radio", IEEE Transactions on Vehicular Technology, Aug. 1991, pp. 599-606, vol. 40, Issue 3.

(56) References Cited

OTHER PUBLICATIONS

Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.

Dolmans, G. et al. "Performance study of an adaptive dual antenna handset for indoor communications", IEE Proceedings: Microwaves, Antennas and Propagation, Apr. 1999, pp. 138-144, vol. 146, Issue 2.

Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.

Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.

Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.

Windyka, John et al., "System-Level Integrated Circuit (SLIC) Technology Development for Phased Array Antenna Applications," Contractor Report 204132, National Aeronautics and Space Administration, Jul. 1997, 94 pages.

Decision on Appeal for U.S. Appl. No. 11/451,237 mailed Mar. 19, 2013, 7 pages.

* cited by examiner

EXTENDING OUTDOOR LOCATION BASED SERVICES AND APPLICATIONS INTO ENCLOSED AREAS

CROSS REFERENCE TO EXISTING APPLICATIONS

Related Applications

This application is a National Stage of PCT/IB2008/055478 filed on Dec. 21, 2008, which claims priority from U.S. Provisional Patent Application No. 61/008313 filed Dec. 20, 2007, which are incorporated herein by reference in their entirety.

FIELD AND BACKGROUND OF THE INVENTION

A cellular phone is an exemplary "mobile unit", a general name used to describe an electronic device which communicates through one or more wireless links with other devices. A mobile unit can be moved from location to location, be positioned at a certain location, or be in continuous movement. Its location or "position" may be determined at any given moment. The term "positioning" describes the process of determining the location of the mobile unit.

There are two positioning concepts, known as "mobile unit-based" and "network-based". In "mobile unit-based" positioning, the location of the mobile unit is determined in the mobile unit, using signals received by the mobile unit. GPS (Global Positioning System)-based positioning represents a specific example of mobile unit-based positioning. A GPS receiver in the mobile unit determines its location through measurement of the time of arrival of signals arriving from satellites. Upon activation, the GPS receiver scans for signals from at least four satellites. Due to the low level of the signals arriving from the satellites and the need to receive the signals directly and not through reflections, the GPS receiver needs a clear view of the sky to achieve a successful position fix. Consequently, the GPS operation is very limited inside buildings and other enclosed spaces.

The "network-based" positioning concept is based on measurement, by one or more receivers of a network, of signals emitted by the mobile unit and calculation of its location based on properties of the received signals. The network may be an outdoor (external) network (for positioning a mobile unit outdoors) or an indoor access point (AP) based network (for positioning a mobile unit indoors or "in a building"). Access points are communication devices installed in a building. In indoor AP network-based positioning, the location of the mobile unit is determined through identifying signals received at the APs from the mobile unit. The signals are relayed by each AP to an indoor location server which calculates the mobile unit position. External network-based and GPS-based positioning require good direct communication links with the mobile unit, a condition that usually can not be satisfied inside buildings. There is no known indoor "mobile unit based" positioning concept based on reception of signals from an AP network.

The positioning of mobile units may be used to enable wireless location-based services (LBS) or location-based applications (LBA), which are emerging as a new opportunity for mobile network operators and other entities to generate new revenue. Industry analysts predict very steep growth in LBS and LBA in the near future. Services such as driving directions, identifying closest banks or restaurants, or tracking people for safety or in emergency situations (via E-911 in North America and E-112 in Europe) are already deployed by wireless network operators. These LBSs and LBAs are mainly applied in outdoor environments.

Some LBSs and LBAs are also known in indoor environments. Examples include navigation in large enclosed areas such as airports and shopping malls; providing the location of an emergency caller to rescue forces and first responders; and complementing other outdoor location based services when the mobile unit is inside buildings and can be identified by the outdoor positioning system. There is a clear interest in extending current and future outdoor LBSs and LBAs to indoor environments. However, there is a major problem with such an extension: since outdoor LBSs and LBAs are based on outdoor positioning capabilities (e.g. GPS or network-based) and since the move indoors limits these outdoor positioning capabilities, outdoor LBSs or LBAs become impossible to apply or become useless indoors.

FIG. 1 shows the prior art relevant to outdoor positioning of a mobile unit using GPS. Each mobile unit (e.g. 102 and 102') is equipped with a main data link (MDL), which is a communication link used by the mobile unit for transferring data to and from a communication network (exemplarily a cellular network) based on wireless technology. While outdoors with clear view of the sky, the GPS receiver in each mobile unit receives the signals of multiple satellites 104, decodes their time of arrival and calculates the distance to each satellite. Since the location of each satellite is known at each moment, the GPS receiver can determine its location based on triangulation in a well-known way. Mobile unit 102 is capable of transmitting a message including its location to a base station (BTS) 106. Base station 106 can deliver the location of mobile unit 102 to an outdoor (also referred to herein as "external" or "remote") location server 108 through a communication network 110. The outdoor location server is used to process and implement outdoor LBSs and LBAs based on the location of a mobile unit, as mentioned above. The location of the mobile unit has an important role in each such service or application. When the mobile unit (marked as 102') is located inside a building 112, it cannot receive adequately the signal of the satellites and cannot have its location determined by GPS or by external network positioning.

FIG. 2 shows the prior art relevant to indoor positioning of a mobile unit using an AP network. A mobile unit 202 is located inside building 112. Access points 204 (shown as AP1, AP2, AP3 . . . APi) communicate with the mobile unit and provide information on the signal received from the mobile unit to an indoor location server 202, which determines the location of the mobile unit-based on the information received from one or more APs. In some embodiments, indoor location server 302 may further use the mobile unit location data to activate a LBS or LBA in the indoor environment.

In order to enable the continuation of external (outdoor) LBSs or LBAs inside enclosed spaces (indoor environments) using the same servers, data bases, "look and feel" etc., there is a need for and it would be advantageous to have methods and systems which use indoor positioning instead of outdoor positioning and which provide the indoor mobile unit location data to the server running the location based service or application. There is also a need for and it would be advantageous to have methods and systems that enable the mobile unit to toggle seamlessly between outdoor and indoor positioning, regardless of whether the outdoor positioning is network-based or mobile unit-based.

SUMMARY OF THE INVENTION

The invention discloses methods and systems for indoor mobile unit-based positioning and for seamlessly toggling a mobile unit positioning between outdoor positioning and indoor positioning. In general, indoor positioning methods (both mobile unit-based and network-based) include use of APs and are therefore referred to as "indoor AP-based positioning". Indoor mobile unit-based positioning makes use of reception of AP signals by the mobile unit and indoor AP network-based positioning makes use of reception of mobile unit signals by the APs. Also disclosed are methods for enabling LBSs or LBAs generated in an outdoor environment to be applied in an indoor environment based on the indoor positioning of a mobile unit. The methods and systems disclosed herein may also provide additional information related to the indoor location of the mobile unit (e.g. a floor, a room name or number or a hall name). The location of the mobile unit may be described by coordinates or by textual description.

A system of the invention can be configured and operated in several modes. The invention enables all described modes to identify, with high accuracy, the location of a mobile unit and to deliver to the mobile unit location based services or applications.

A system of the invention which supports the extension of the outdoor LBS and LBA to indoors includes the following: access points installed in the building, which communicate with the mobile unit, an added data link (ADL) and a distributed antenna system (DAS) or another type of system for enabling cellular communications inside the building. An ADL is an additional communication channel supported by components within the mobile unit. Exemplarily, the ADL may be based on PAN/LAN technologies such as "Bluetooth" or "WiFi". Hereinafter, "DAS" refers not only to a distributed antenna system but also to any system which distributes cellular signals in a building. Each mobile unit is also equipped with hardware (HW)/software (SW) or a combination of HW and SW which allows it, in some embodiments, to perform indoor mobile unit-based positioning or to use AP network-based positioning. Each mobile unit is further equipped with a "location support module" used for (but not limited to) the following functions: (a) if the location is obtained through AP network-based positioning, calculating the location and translating it to the required coordinate system; (b) inserting the location data into a GPS like message if the positioning system replaces the GPS system; (c) toggling between GPS based positioning to the indoor positioning system; and (d) harnessing the keys and display of the mobile unit for use with a specific LBS or LBA.

The indoor mobile unit-based positioning is done as follows: the APs are installed inside the building in a way such that each AP creates a small cell and transmits a beacon signal which includes information on its location. This information includes at least one of (but not limited to) the following types of data: (a) coordinates of the AP provided in any agreed datum system such as UTMS (Universal Transverse Mercator System), WGS-84 (World Geodetic System) or GRS-1980 (Geodetic Reference System); and (b) textual information such as floor designation, name or description of the area, hall, room, etc. Floors, areas, halls, rooms, etc are defined herein as "indoor entities" of an indoor environment. As an example, the location information provided by the AP may be in form of Y=12.45.34.34.23; X=56.55.82.98.52, X=56.55.82.98.52, Z=66.52.82.18.23 floor #2 GAP store. The software in the mobile unit, and more specifically the location support module scans the transmissions from the APs through the ADL. Once a beacon with location information is received from one or more APs, the location support module calculates the mobile unit location, based on the received information. The mobile unit location is then transferred through the DAS located in the building to a cellular network link, which relays the mobile unit location to an external location server (ELS). The ELS may then provide the mobile unit, while indoors, with location-based services or location-based applications normally provided to the mobile unit while outdoors. The ELS may serve a mix of outdoor and indoor mobile units. In this case, the invention enables a seamless integration of the indoor elements in a wider location based system.

In some embodiments, there is provided a method for supplying a location based service or location based application generated in an outdoor environment to a mobile unit positioned in an indoor environment, comprising the steps of determining the mobile unit location, relaying data related to the mobile unit location through a DAS to an ELS and providing the location based service or location based application generated in the outdoor environment from the ELS to the mobile unit.

In some embodiments, there is provided a system for supplying a LBS or a LBA generated by an ELS in an outdoor environment to a mobile unit positioned in an indoor environment which includes an AP network and a DAS, comprising location data acquisition and processing means in the mobile unit for acquiring and processing data related to the mobile unit location in the indoor environment and a cellular link for transmitting at least some of the data related to the mobile unit location to the ELS and for transmitting the LBS or LBA from the ELS to the mobile unit.

BRIEF DESCRIPTION OF THE DRAWINGS

The invention is herein described, by way of example only, with reference to the accompanying drawings, wherein.

DETAILED DESCRIPTION OF THE INVENTION

A more complete understanding, as well as further features and advantages of the invention will be apparent from the following detailed description and the accompanying drawings.

Figure 3:
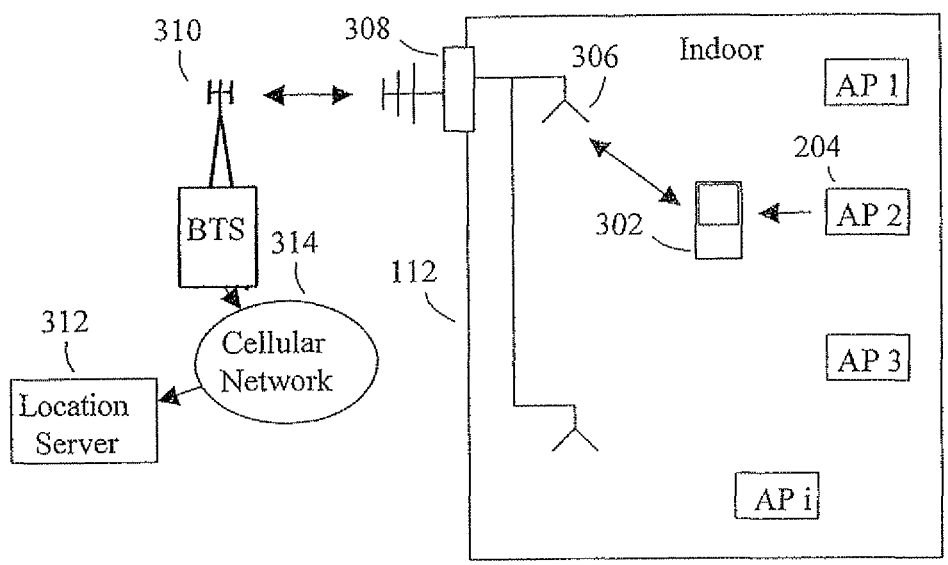
FIG. 3 shows an embodiment of a positioning system of the invention.

FIG. 3 shows an embodiment of a positioning system of the invention. A mobile unit 302 is located inside building 112. In some embodiments of a method for mobile unit positioning according to the invention, mobile unit 302 receives signals with location messages transmitted by APs 204 and self-determines its location based on location messages received from one or more of the APs. In other embodiments of a method for mobile unit positioning according to the invention, mobile unit 302 self-determines its location by evaluation of one or more properties of the signals transmitted by the APs (such as, but not limited to, signal strength, time of arrival and the like). In some embodiments, after determining its location, the mobile unit can transmit a message containing its location to an external network through an indoor DAS 306 connected to a repeater 308. Repeater 308 relays the message received from the DAS to a base station (BTS) 310, which further relays the message an external location server 312 through a communication (in this case cellular) network 314. In other embodiments, the signal of the mobile unit containing the message with its position may be provided directly from the DAS (distributed antenna system) to a base station installed inside the building (not shown) or close to the building, using a physical connection such as coaxial cable or a combination of coaxial cable and fiber-optic media (not shown).

Several algorithms can be used for calculating the mobile unit location in indoor mobile unit positioning. The simplest (and used exemplarily only) is based on AP signal strength. The algorithm assumes that the strength of a signal received from an AP is related to the distance of the mobile unit from the AP. If the signal of only one AP is received, then the algorithm decides that the location of the mobile unit is the location of the received AP. If signals of two or more APs are received, then the mobile unit uses the signal strength as a criterion for determining the relative distance from each AP and for calculating more accurately the location of the mobile unit. This calculation may exemplarily be done by triangulation, giving a higher "weight" to the location of the AP with the stronger signal.

The following is an example of another indoor mobile unit-based positioning algorithm, having as inputs the AP location. Assume that the location received by the mobile unit from AP1 is X1, Y1 and the location received from AP2 is X2, Y2. Assume also that the ratio between the signal strength (in decibels) of the signal received from AP1 to the signal strength (in decibels) of the signal received from AP2 is "G". The mobile unit calculates it position as $Xm=(G \times X1+X2)/(2 \times G)$; $Ym=(G \times Y1+Y2)/(2 \times G)$. In another example, an indoor mobile unit-based positioning algorithm may use a difference in the time of arrival of the signals from APs to determine respective distances from each AP.

Figure 1:
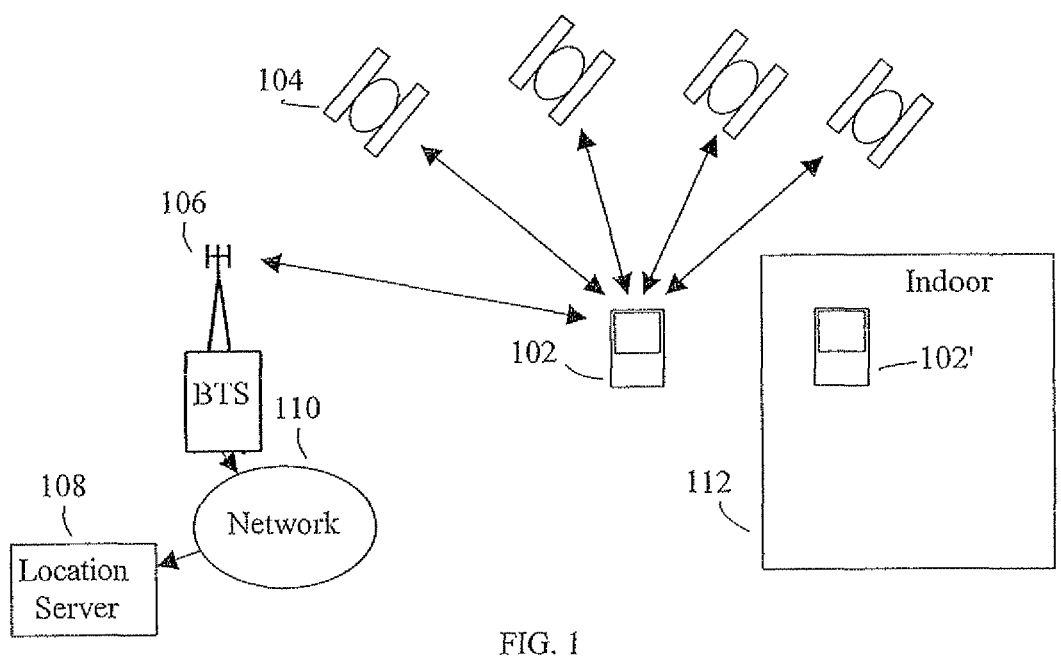
FIG. 1 shows the prior art relevant to outdoor positioning of a mobile unit.
Figure 2:
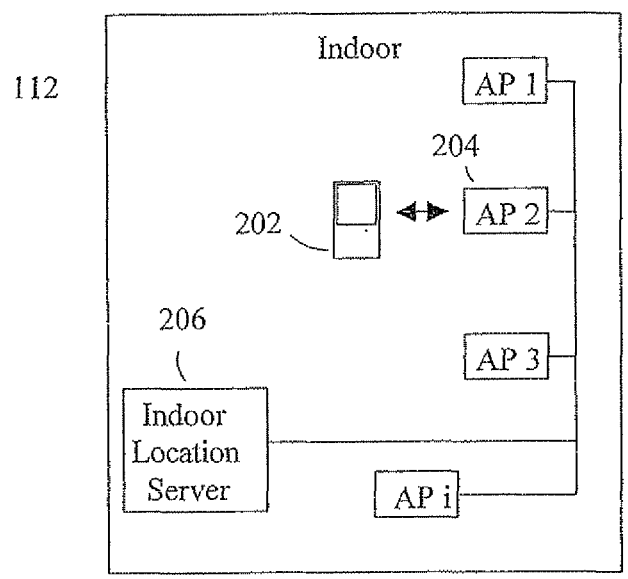
FIG. 2 shows the prior art relevant to indoor positioning of a mobile unit.
Figure 4:
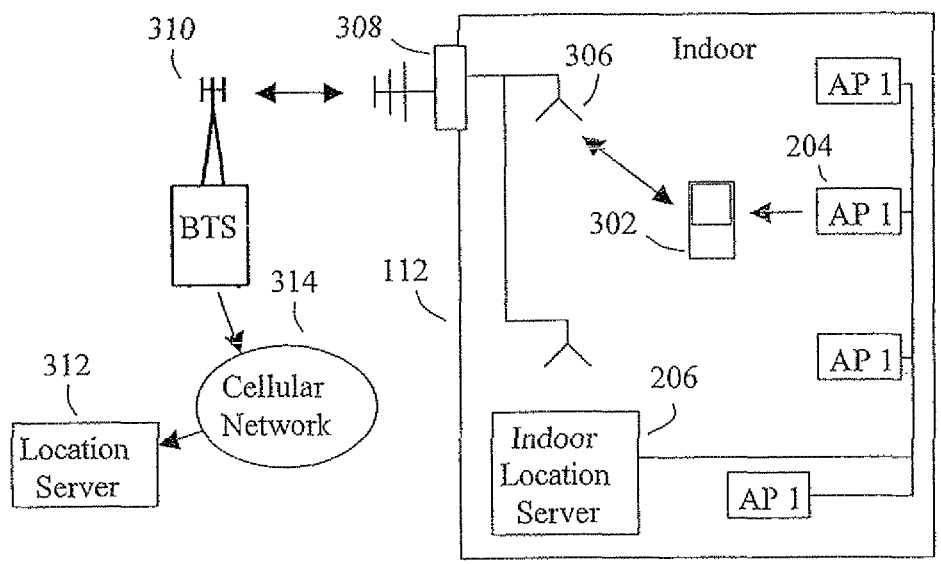
FIG. 4 shows another embodiment of a positioning system of the invention.

FIG. 4 shows yet another embodiment of a positioning system of the invention, which includes essentially the system described in FIG. 3, but in which the mobile unit location is determined by indoor location server 302 and provided to the mobile unit through the APs. The mobile unit location data is delivered from the mobile unit to ELS 312 through a cellular communication link similar to that shown in FIG. 2. This communication link includes indoor DAS 206 coupled with repeater 308, base station 310 and cellular network 314. While the mobile unit indoor location is determined by indoor location server 302 based on the information received from one or more APs, in contrast with prior art, a LBS or LBA is managed by ELS 312 and provided to the indoor mobile unit through the MDL (main data link), using the cellular network including BTS 310 and the DAS 306 or any other similar indoor distribution system for cellular communications.

Figure 5:
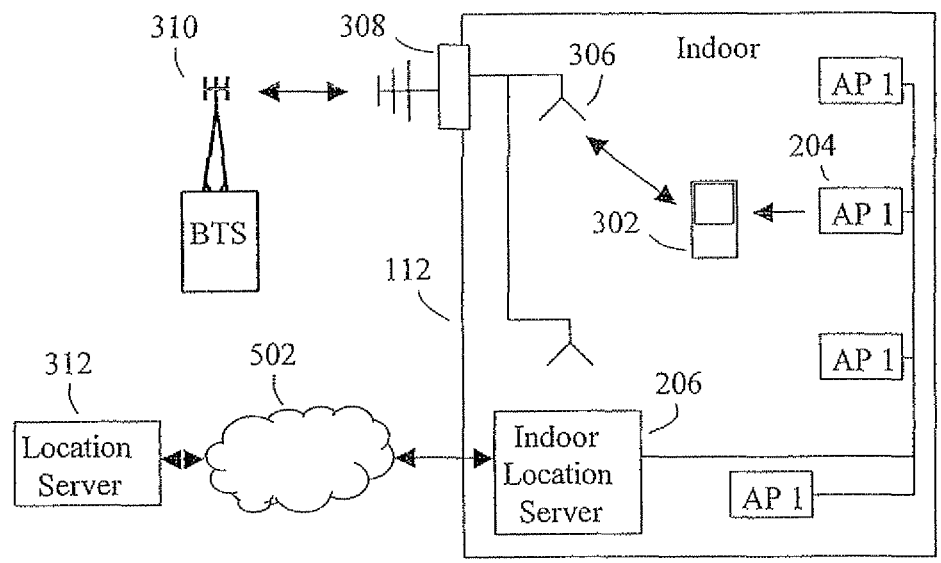
FIG. 5 shows yet another embodiment of a positioning system of the invention.

FIG. 5 shows yet another embodiment of a positioning system of the invention, similar to that in FIG. 4 but with a dedicated or public network 502 replacing cellular network 314 as means of transmitting data. All other components are identical in function and indicated by numerals identical with those in FIG. 4. In this embodiment, ELS 312 may be part of the cellular core network but can also be operated by another business entity. The location of the mobile unit may be determined either by the mobile unit (mobile unit-based positioning) or by the AP network in cooperation with the indoor location server (AP network-based positioning). As in the system of FIG. 4, in contrast with prior art, a LBS or LBA is managed by ELS 312 and provided to the indoor mobile unit either through the indoor location server 206 and the APs 204 or through the cellular communication link comprised of cellular network 314, BTS 310, repeater 308 and DAS 306. In some embodiments, DAS 306 may be replaced by a similar indoor distribution system used for cellular communications.

Figure 6:
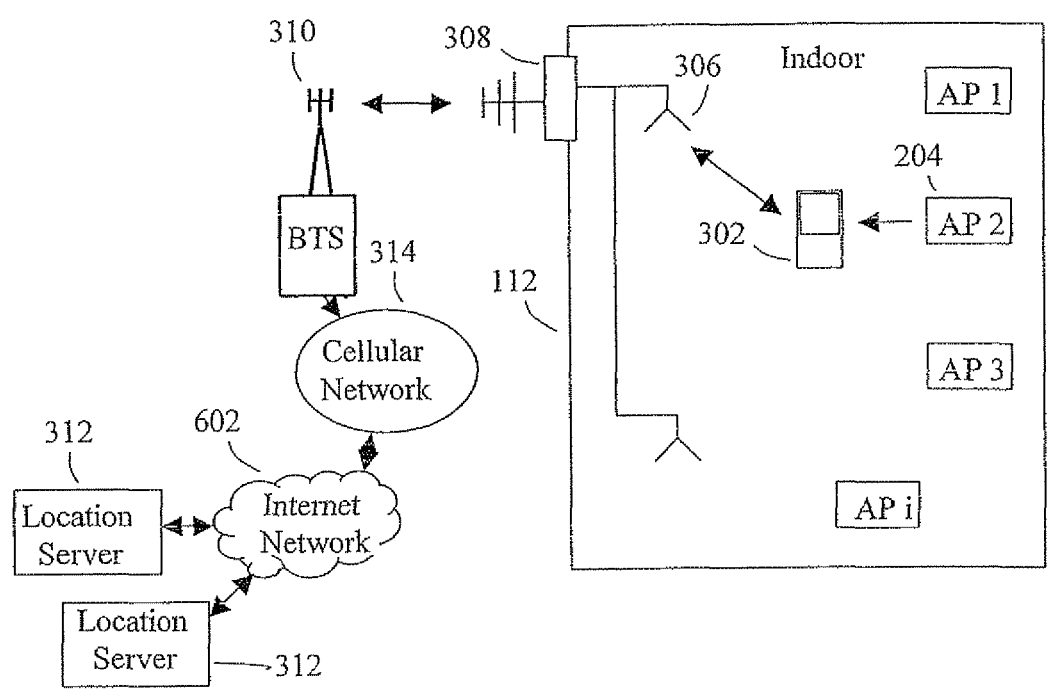
FIG. 6 shows yet another embodiment of a positioning system of the invention.

FIG. 6 shows yet another embodiment of a positioning system of the invention, similar to that in FIGS. 3 and 5. The main difference here is that, although the mobile unit location is electronically transmitted out of the building using the cellular link, ELS 312 is not a part of the cellular core network but belongs to another system or business entity. The connection between the cellular network and ELS 312 is realized through an Internet network ("web") 602, to which access is accomplished through cellular network 314. By accessing the web, it is possible for the user to connect to a variety of external location servers and to a variety of location based applications and services provided by a variety of business entities. All other components are identical in function and indicated by numerals identical with those in FIG. 3 and FIG. 5. As in previous embodiments, the BTS is used for communicating LBSs and LBAs to the mobile unit, from the external locations server through the internet network ("web") 602 and through the cellular communication link comprised of cellular network 314, BTS 310, repeater 308 and DAS 306. In some embodiments, DAS 306 may be replaced by a similar indoor distribution system used for cellular communications.

Figure 7:
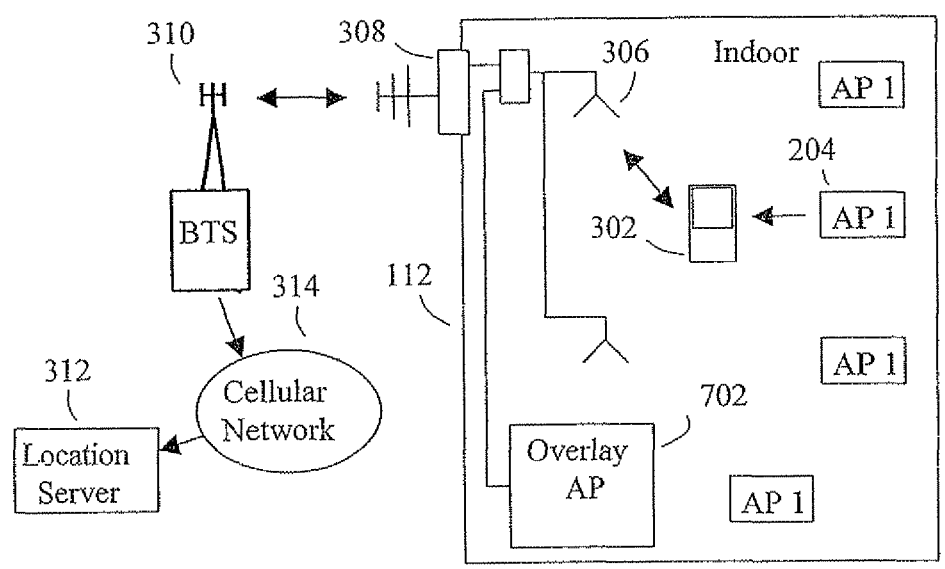
FIG. 7 shows yet another embodiment of a positioning system of the invention including an "overlay AP" link distributed all over the building through a distributed antenna system.

FIG. 7 shows yet another embodiment of a positioning system of the invention, which essentially includes the components shown in FIG. 3, plus an "overlay AP" 702. The access points transmit only beacons with their identification number (ID) to a mobile unit inside the building, allowing the mobile unit to self-determine its location (i.e. perform mobile unit-based positioning), as explained above. In this embodiment, the presence of the DAS may be used to simplify the operation of the APs and the communication between the mobile unit and the APs. The overlay AP provides a control channel which is broadcast through the DAS inside the building. This control channel is received by each mobile unit throughout the building. Through the control channel, each mobile unit can be offered to join a LBS provided in the building, or to be turned ON automatically Another important function that can be performed by the control channel is "pairing"—a process in which the ADL in the mobile unit identifies the existence of the location based capability in the building and approves its participation. A cross reference table which matches the identification numbers to descriptions of specific locations is downloaded from the overlay AP through the ADL to each participating mobile unit. This way, the mobile unit does not need to have a bidirectional communication with the APs, but only needs to receive and decode their signal.

Figure 8:
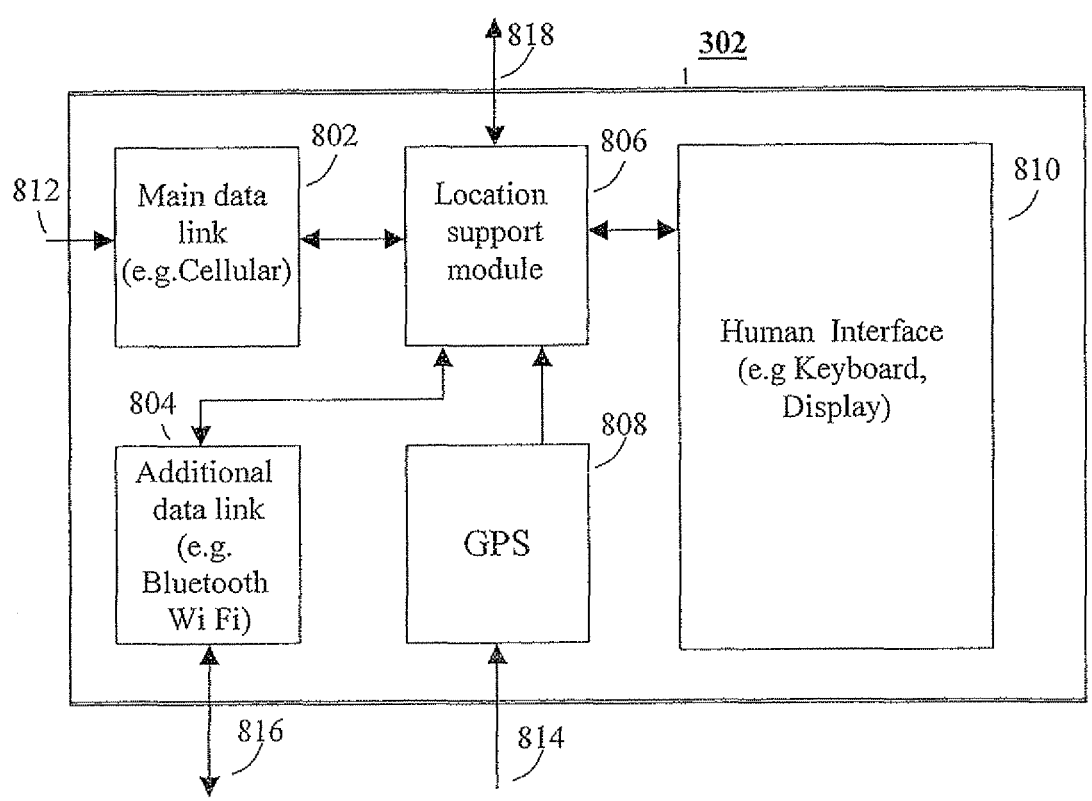
FIG. 8 shows the internal building blocks of a mobile unit.

FIG. 8 shows the internal building blocks of the mobile unit (realized by HW, SW or a combination of HW and SW) which support the functionality of the mobile unit as required by this invention. The internal building blocks of the mobile unit that support the positioning functionality are: a main data link 802, an additional data link 804, a GPS receiver 808, a human interface means (e.g. keys, display) 810 and a location support module 806 used for (but not limited to) the following functions: (a) if the location is obtained through the reception of the AP signals, calculating the location and translating it to the required coordinate system; (b) inserting the location data into a GPS like message if the positioning system replaces the GPS system; (c) toggling between GPS based positioning to the indoor positioning system; and (d) harnessing the keys and display of the mobile unit for use with a specific LBS or LBA. The mobile unit may have a physical connection 818 used to communicate data related to the LBS or LBA to external devices. Numeral 812 represents an antenna of the main data link, numeral 814 represents an antenna of the GPS and numeral 816 represents an antenna of the ADL.

Substitution of GPS Positioning

Figure 9:
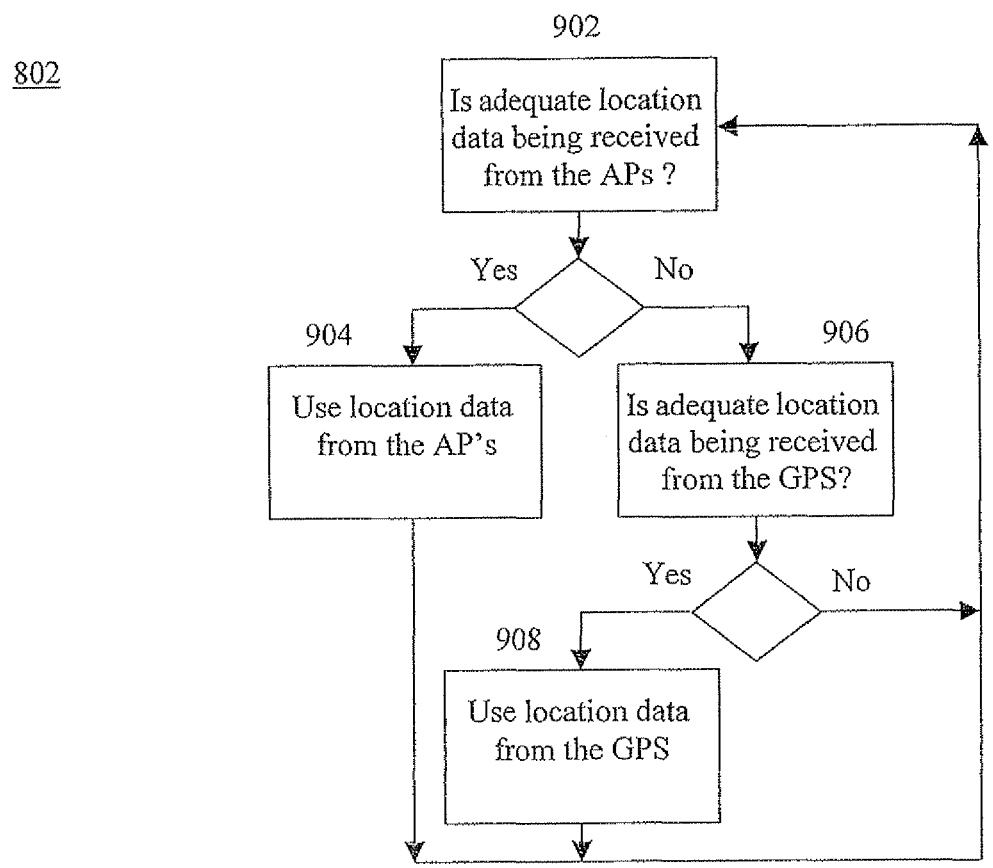
FIG. 9 describes the flow chart of a process for toggling a positioning system of the invention between GPS or AGPS based positioning and indoor AP-based positioning.

The invention includes a mechanism that enables to replace the GPS-based positioning by indoor AP-based positioning (referred to herein as "toggling"). FIG. 9 describes this toggling process, which applies also to Assisted GPS (AGPS)-based positioning. Both the output of GPS receiver 808 and the output of the ADL receiver are fed to the location service module. In step 902, the mobile unit checks whether it receives, through the ADL, location data transmitted by APs. If location data from APs is received ("yes"), then the mobile unit uses the data as is (in the case of AP-network-based positioning) or calculates its location in step 904. If no adequate location data from APs is received in check step 902 ("no"), then the mobile unit checks whether it receives location data from the GPS in step 906. If location data from the GPS is received ("yes"), the mobile unit uses the GPS data to determine its positioning in step 908. If no adequate location data from the GPS is received in check step 906 ("no"), the mobile unit returns to step 902 and tries again to get positioning data from APs. Similarly, the process loops back to step 902 after each of steps 904 and 908.

Substitution of Network-Based Positioning

In network-based positioning, the network is not expecting to get an explicit location data from the mobile unit but tries to determine the location of the mobile unit-based on properties of the signal of the mobile unit, received by one or more of the receivers of the network. According to the invention, the location application module is signaling the network through the MDL that the mobile unit is now served by an indoor positioning apparatus and provides the network the location of the mobile unit. The location application module includes a decision mechanism which operates according to the processes shown in FIG. 10. This mechanism is used to determine that AP's location data is available and inform the network that location data will be provided by the mobile unit.

Figure 10:
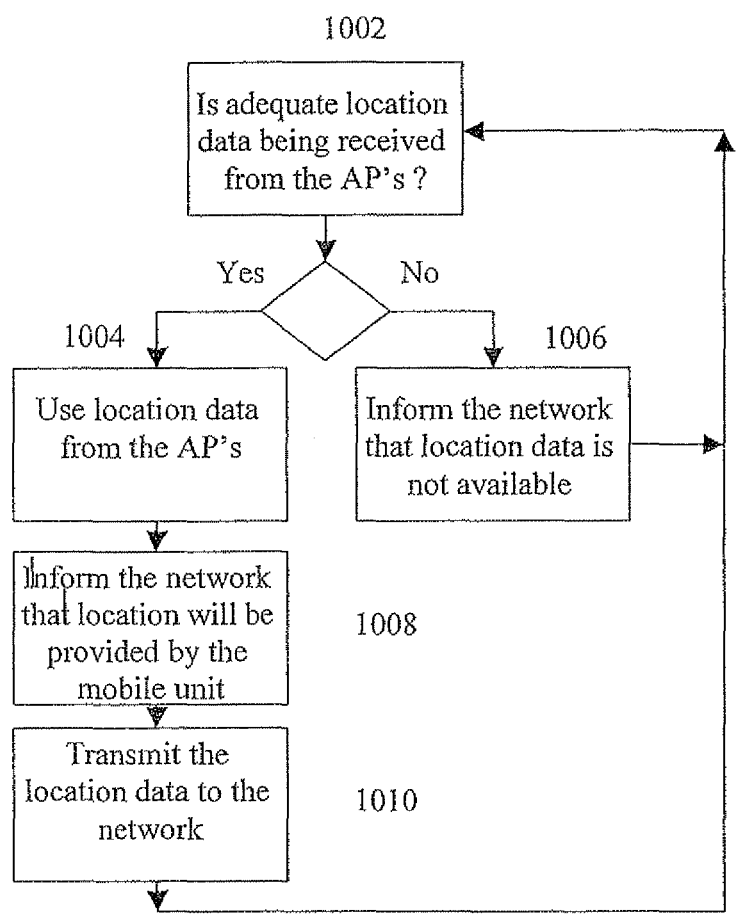
FIG. 10 describes the flow chart of a process for toggling a positioning system of the invention between outdoor network-based positioning and indoor AP-based positioning.

FIG. 10 describes the process for toggling a positioning system of the invention between outdoor network-based positioning and indoor AP-based positioning. In step 1002, the mobile unit checks whether it receives location data transmitted by APs. If location data from APs is received ("yes"), then the mobile unit uses the data as is (in the case of AP-network-based positioning) or calculates its location in step 1004. In step 1006 it informs the network-based positioning system (using the MDL) that the location data will be provided by the mobile unit. In step 1008 it transmits the location data to the network. If no adequate location data is received from APs in check step 1002 ("no"), then the mobile unit informs the network, using the MDL, that location data is not available in step 1010.

Translation of the location information generated by the indoor positioning system to "GPS based location information" format may be done through formulas and/or look up tables activated by a software algorithm, in ways well known in the art. A mobile unit of the invention translates the location data, generated by using the APs network to the format of the GPS location data and inserts this data into the messages between the mobile unit and the external location server, in the same format used for delivering GPS based location data. The location server can then process the location data in exactly the same way it processes GPS based location data. Since different systems may use different formats for communicating GPS location data, the mobile unit may include a translator to several formats.

Indoor High Granularity Specific Information

According to the invention, the indoor positioning data may include additional information that can not be described by coordinates. This additional information may be: floor designation, area of the building, name of the area, hall or room where the mobile unit is located and the like. This information may be very useful for LBSs or LBAs in an indoor environment.

According to the invention, the location data obtained by the indoor positioning system may include at least one of the following types of information: (a) coordinates provided in any agreed datum system; and (b) textual information such as floor designation, name or description of the area, hall, room etc. This information can be used by the location server to avoid wrong positioning that might occur due to some reflection scenarios and other disturbances to the signals used for positioning. The positioning algorithm correlates the previous locations with the new one and excludes unrealistic scenarios. For example, if in the last few seconds the mobile unit was located on floor #4 and suddenly, after a short time, due to disturbance to the signals used for the positioning, the mobile unit is found on floor #3, the algorithm "will be cautious" about this new position and may "want" to get a few more measurements before deciding that the mobile unit has moved from floor #4 to floor #3.

In summary, the invention enables to substitute GPS or outdoor network-based positioning with indoor AP-based positioning for a mobile unit in an indoor environment. In addition to the enablement of positioning inside buildings where external signals are strongly attenuated, the invention provides higher accuracy as well as positioning information like floor designation, area name, etc. The invention enables a mobile unit to be integrated in a location based application which usually uses a GPS receiver for generating the location data. By way of example, assume that Google provides an application for locating stores or services (bank etc.) while a mobile unit user is outdoors. Assume also that this application is supported by mobile units equipped with GPS. The invention enables to seamlessly extend the use of the same application to enclosed areas such as shopping malls and airports, where satellite signals can not be received. By "seamlessly" we mean that no change will have to be made in the original application and its supporting servers. By "integration" we mean that the AP-based positioning solution can be made a part of the already existing location based application.

While the invention has been described with respect to a limited number of embodiments, it will be appreciated that many variations, modifications and other applications of the invention may be made. What has been described above is merely illustrative of the application of the principles of the present invention. Those skilled in the art can implement other arrangements and methods without departing from the spirit and scope of the present invention.

The invention claimed is:

1. A method for supplying a location based service or location based application generated in an outdoor environment to a mobile unit positioned in an indoor environment, comprising the steps of:

a) determining the mobile unit location by access point (AP)-based positioning;
b) relaying data related to the mobile unit location through a distributed antenna system (DAS) to an external location server (ELS) by transmitting the data through a cellular communication link;
c) providing the location based service or location based application generated in the outdoor environment from the ELS to the mobile unit;
d) toggling the determining the mobile unit location from AP-based positioning to external network-based positioning when the mobile unit moves from the indoor environment to an outdoor environment; and
e) toggling the determining of the mobile unit location from external network-based positioning to AP-based positioning when the mobile unit moves from the outdoor environment to the indoor environment,
wherein the cellular communication link includes a cellular network coupled to the DAS through a base server.

2. The method of claim 1, wherein the AP-based positioning includes mobile unit-based positioning using AP signals.

3. The method of claim 1, wherein the AP-based positioning includes AP network-based positioning.

4. The method of claim 1, wherein the step of providing includes providing the location based service or location based application through a cellular communication link.

5. The method of claim 4, wherein the cellular communication link includes a cellular network coupled to the DAS through a repeater.

6. The method of claim 1, wherein the step of providing includes providing the location based service or location based application through a cellular network coupled to a public network.

7. The method of claim 1, wherein the data related to the mobile unit location includes a description of an indoor entity of the indoor environment.

8. The method of claim 7, wherein the indoor entity is selected from the group consisting of an area, a floor, a hall and a room.

9. The method of claim 1, further comprising the step of distributing an overlay AP signal through the DAS to the mobile unit.

* * * * *